US007570455B2

(12) United States Patent
Deguchi et al.

(10) Patent No.: US 7,570,455 B2
(45) Date of Patent: Aug. 4, 2009

(54) DATA STORAGE DEVICE AND MAGNETIC DISK DRIVE IN HERMETICALLY SEALED CONDITION

(75) Inventors: Takaaki Deguchi, Kanagawa (JP); Mutsuro Ohta, Kanagawa (JP); Kanako Abe, Kanagawa (JP); Akira Morita, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 351 days.

(21) Appl. No.: 11/138,233

(22) Filed: May 25, 2005

(65) Prior Publication Data

US 2005/0265113 A1   Dec. 1, 2005

(30) Foreign Application Priority Data

May 25, 2004   (JP)   ............... 2004-154562

(51) Int. Cl.
*G11B 33/14* (2006.01)
(52) U.S. Cl. .................... 360/97.02; 365/232
(58) Field of Classification Search ........................ None
See application file for complete search history.

(56) References Cited

U.S. PATENT DOCUMENTS

| | | | |
|---|---|---|---|
| 5,187,621 A * | 2/1993 | Tacklind | 360/97.02 |
| 5,317,462 A * | 5/1994 | Kakizaki et al. | 360/97.02 |
| 5,898,537 A * | 4/1999 | Oizumi et al. | 360/97.01 |
| 6,373,654 B1 * | 4/2002 | Iwahara et al. | 360/97.01 |
| 6,567,237 B2 * | 5/2003 | Iwahara et al. | 360/97.02 |
| 6,619,667 B2 * | 9/2003 | Kawaguchi et al. | 277/628 |

FOREIGN PATENT DOCUMENTS

| | | |
|---|---|---|
| JP | 10-334641 | 12/1998 |
| JP | 11-232833 | 8/1999 |
| JP | 2000-234652 | 8/2000 |
| JP | 2002-367355 | 12/2002 |

\* cited by examiner

*Primary Examiner*—Mark Blouin
(74) *Attorney, Agent, or Firm*—Townsend and Townsend and Crew LLP; Darren Gold

(57) ABSTRACT

Embodiments of the present invention provide a data storage device and a magnetic disk drive capable of maintaining the inside of a base in a hermetically sealed condition. In one embodiment, a data storage device includes a recording disk, a base having a through hole, a top cover having a tapping hole aligned with the through hole and a depressed portion with the tapping hole formed in a bottom thereof, and a screw inserted through the through hole into threaded engagement with the tapping hole and having a head which comes into close contact with an outer surface of the base. The top cover is fitted inside the base in a state in which the depressed portion is positioned on the base side, and the bottom of the depressed portion comes into close contact with the base in the threadedly engaged state of the screw and in an area which surrounds the through hole.

18 Claims, 3 Drawing Sheets

DATA STORAGE DEVICE AND MAGNETIC DISK DRIVE IN HERMETICALLY SEALED CONDITION

CROSS-REFERENCES TO RELATED APPLICATIONS

This application claims priority from Japanese Patent Application No. JP2004-154562, filed May 25, 2004, the entire disclosure of which is incorporated herein by reference.

BACKGROUND OF THE INVENTION

The present invention relates to a data storage device and a magnetic disk drive.

Devices using various types of media such as optical disks and magnetic tapes are known as data storage devices. Among them, hard disk drives (HDDs) have become popular as storage devices for computers and they are one of the storage devices indispensable in the current computer system. Further, not limited to computer system, use of hard disks is increasing more and more due to the superior characteristics with the advent of moving picture recording/reproducing devices, car navigation systems, removable memories for digital cameras and so on.

The hard disk drive is provided with a magnetic disk, an actuator and a head. The magnetic disk stores data. The head reads and/or writes data with respect to the magnetic disk. The actuator is driven by a voice coil motor and pivots about a pivot shaft. The actuator causes the head to move radially over the magnetic disk, whereby the head can access a desired track formed on the magnetic disk and perform a data read/write processing.

Various components, including the magnetic disk, are mounted on a base. The base is covered with a top cover. The top cover is screwed to the base. A sealing tape is affixed onto the top cover. An example of such a hard disk drive is disclosed in Japanese Patent Laid Open No. Hei 11-232833 (Patent Literature 1). The hard disk drive disclosed in Patent Literature 1 is shown in a sectional view of FIG. 5.

In the hard disk drive shown in FIG. 5, which is indicated at 900, a stepped surface 920 is formed inside a base 910. A screw 940 is threadedly fitted in the stepped surface 920 from the top cover 930 side. The screw 940 is secured to a concave portion 950 which is depressed from a surface of the top cover 930. With the top cover 930 thus screwed to the base 910, an upper surface of an outer periphery of the base 910 and the surface of the top cover 930 are approximately flush with each other.

The whole of the top cover 930 screwed to the base 910 is covered with a sealing tape 960. The sealing tape 960 covers the whole periphery of an open edge of the base 910 and seals a seam 911 between the base 910 and the top cover 930 hermetically. As a result, the top cover 930 is confined inside the sealing tape 960, and the screw 940 and a through hole 970 for fixing the top cover 930 are also enclosed inside the sealing tape 960. Consequently, the generation of an air current in the seam 911 between the base 910 and the top cover 960 and resultant oscillation of air are prevented and noise is suppressed.

As another example, a hard disk drive which prevents the entry of outside air into the inside of a base is disclosed in Japanese Patent Laid Open No. Hei 10-334641 (Patent Literature 2). This hard disk drive is not shown. A thin top cover formed by press working is used in the hard disk drive disclosed in Patent Literature 2. The top cover is fitted inside an inner periphery surface of a base and is screwed from above to the base located below the top cover in this state. A tapping hole formed on the top cover side for threaded engagement therewith of a screw is formed in a clamping surface lower than the top cover surface to prevent projection of a head of the screw from the top cover surface.

A sealing tape is affixed onto the top cover from above the tightened screw. The affixed sealing tape covers the top cover surface completely and also covers the tightened screw. Further, the sealing tape completely closes a gap formed between the base and the top cover to prevent the entry of outside air into the base through the gap. In this hard disk drive, a packing is sandwiched between the base and the top cover to keep the inside of the base in a hermetically sealed condition.

A minidisk read/write apparatus is disclosed in Japanese Patent Laid Open No. 2000-234650 (Patent Literature 3). In this patent literature, a structure wherein a cover (a deck-side frame) is screwed to a chassis from below is disclosed in the minidisk read/write apparatus. More specifically, a shaft portion of a screw for fixing the cover is disposed at a predetermined gap from a through hole formed in the chassis without contact with the through hole. Further, a head of the screw is disposed at a predetermined gap from a fitting hole without contact with the fitting hole having larger diameter than the through hole. Thus, the screw is mounted spacedly from and without contact with the chassis. If the cover and the chassis oscillate in the gap between the screw head and the chassis, the oscillation is absorbed by an elastic rubber member. Thus, the read/write apparatus disclosed in Patent Literature 3 has a structure wherein the screw, especially the screw head, and the chassis are spaced from each other.

For tightening the screw positively when the top cover is screwed to the base, the larger number of screw threads on the side face of the tapping hole is preferable. In each of the hard disk drives disclosed in Patent Literatures 1 and 2, the screw for fixing the top cover is threadedly engaged with the base from the top cover side. In case of forming the base by die casting, the base can be formed thick unlike press working, so that a tapping hole can be formed deep in the base and hence it is possible to increase the number of screw threads on the side face of the tapping hole.

BRIEF SUMMARY OF THE INVENTION

The present invention has been accomplished with the above-mentioned circumstances as background and it is a feature of the invention to provide a data storage device and a magnetic disk drive both capable of keeping the inside of a base in a hermetically sealed condition.

In a first aspect of the present invention, there is provided a data storage device including a medium for recording data, a base in which the medium is accommodated, the base having a hole, a top cover having a tapping hole aligned with the hole, and a screw inserted through the hole into threaded engagement with the tapping hole, the screw having a head which comes into close contact with a surface of the base, wherein the top cover is fitted inside the base and is put in close contact with the base in an area which surrounds the hole and in the threadedly engaged state of the screw. Since the top cover comes into close contact with the area which surrounds the hole formed in the base, the air present within the base can be prevented from leaking through the hole formed in the base and through the tapping hole formed in the top cover.

Preferably, the base is formed by press working. The hole is a through hole and the screw comes into threaded engagement with the tapping hole in an inserted state thereof through the through hole. The base and the through hole can be formed by press working inexpensively.

The top cover has a depressed portion, the tapping hole is formed in a bottom of the depressed portion, the top cover is fitted inside the base in a state in which the depressed portion is positioned on the base side, and the bottom of the depressed portion is put in close contact with the base in the area which surrounds the hole. With the depressed portion, the top cover can be brought into close contact with the base more easily in the area which surrounds the hole.

The data storage device further includes a sealing tape which covers the tapping hole. The sealing tape comes into close contact with an outer periphery of the depressed portion to seal the depressed portion hermetically. Since the sealing tape seals the depressed portion hermetically, the air present within the base can be surely prevented from leaking from the screw side of the tapping hole.

The sealing tape is a single sealing tape which covers the whole surface of the top cover. The sealing tape for preventing the leakage of air from between the base and the top cover can also be used as the sealing tape for preventing the leakage of air from the tapping hole. Thus, by merely affixing a single sealing tape for closing up the gap between the base and the top cover to the whole of the top cover, the inside of the base can be maintained in a hermetically sealed condition positively. Consequently, it is possible to avoid an increase of the production cost caused by taking measures for keeping the inside of the base in a hermetically sealed condition.

The depressed portion has a projecting portion formed on the bottom thereof, and the tapping hole is a burring tap formed within the projecting portion. Therefore, it becomes easier for the top cover to surround the hole formed in the base and the leakage of air can be prevented easily.

In a second aspect of the present invention, there is provided a data storage device including a medium for recording data, a base in which the medium is accommodated, the base having a hole, a top cover having a tapping hole aligned with the hole, a screw inserted through the hole into threaded engagement with the tapping hole, the screw having a head which comes into close contact with a surface of the base, and a sealing tape which covers the tapping hole. Since the sealing tape prevents the leakage of air on the screw side of the tapping hole, it is possible to keep the inside of the base in a hermetically sealed condition.

Preferably, the base is formed by press working. The hole is a through hole, and the screw is threadedly engaged with the tapping hole in an inserted state thereof through the through hole. Since the base and the through hole can be formed by press working, both can be formed inexpensively.

Further, in the data storage device of the second aspect, the top cover is fitted inside the base and along an outer periphery of the base, and the sealing tape is put in close contact with the top cover and the base to seal a gap between the base and the top cover. The sealing tape may be a single sealing tape which covers the whole surface of the top cover.

The sealing tape for preventing the leakage of air from between the base and the top cover can also be used as the sealing tape for preventing the leakage of air from the tapping hole. Thus, by merely affixing a single sealing tape for closing up the gap between the base and the top cover to the whole of the top cover, the inside of the base can be maintained in a hermetically sealed condition positively. Consequently, it is possible to avoid an increase of the production cost caused by taking measures for keeping the inside of the base in a hermetically sealed condition.

In the data storage device of the second aspect, the top cover has a close-contact portion which, in the threadedly engaged state of the screw, comes into close contact with the surface on the top cover side of the base in a surrounding relation to the through hole. Since the top cover comes into close contact with the top cover-side surface of the base, the air present within the base can be prevented from leaking through the tapping hole. Consequently, the inside of the base can be surely maintained in a hermetically sealed condition.

In the data storage device of the second aspect, the top cover has a depressed portion, the tapping hole is formed in a bottom of the depressed portion, the tap cover is fitted inside the base in a state in which the depressed portion is positioned on the base side, the bottom of the depressed portion is put in close contact with the base in an area which surrounds the hole and in the threadedly engaged state of the screw, the sealing tape is put in close contact with an outer periphery of the depressed portion to seal the depressed portion hermetically, the depressed portion has a projecting portion formed on the bottom thereof, and the tapping hole is a burring tap formed within the projecting portion. Since the portion where the tapping hole is formed is depressed, the sealing tape for closing up the gap between the base and the top cover can be affixed easily. Further, it becomes easier for the top cover to surround the hole formed in the base and the leakage of air can be prevented easily.

In the data storage device of the second aspect, the top cover has a close-contact portion which, in the threadedly engaged state of the screw, comes into close contact with the surface on the top cover side of the base in a surrounding relation to the through hole, the top cover is fitted inside the base and along an outer periphery of the base, and the sealing tape is put in close contact with the top cover and the base to seal a gap formed between the base and the top cover. Since the top cover comes into close contact with the top cover-side surface of the base, the air present within the base can be prevented from leaking through the tapping hole. Therefore, the inside of the base can be surely maintained in a hermetically sealed condition.

In the data storage device of the second aspect, the top cover is fitted inside the base and along an outer periphery of the base, the sealing tape is put in close contact with the top cover and the base to seal a gap formed between the base and the top cover, the top cover has a depressed portion, the tapping hole is formed in a bottom of the depressed portion, the top cover is fitted inside the base in a state in which the depressed portion is positioned on the base side, the bottom of the depressed portion is put in close contact with the base in an area which surrounds the hole and in the threadedly engaged state of the screw, and the sealing tape is put in close contact with an outer periphery of the depressed portion to seal the depressed portion hermetically. Since the portion where the tapping hole is formed is depressed, the sealing tape for closing up the gap between the base and the top cover can be affixed easily.

The depressed portion has a projecting portion formed on the bottom thereof, and the tapping hole is formed within the projecting portion. Therefore, it becomes easier for the top cover to surround the hole formed in the base and the leakage of air can be prevented easily.

In a third aspect of the present invention there is provided a magnetic disk drive including a magnetic disk for recording magnetic data, a motor for rotating the magnetic disk, a head for making access to a recording area on the magnetic disk, a base which accommodates the magnetic disk, the motor and the head, a top cover fitted inside the base and along an outer periphery of the base, a sealing tape which is put in close contact with the top cover and the base to seal a gap formed between the base and the top cover, and a screw for fixing the base and the top cover, wherein the top cover has a depressed portion depressed on the base side and with a tapping hole formed in a bottom thereof, the screw is inserted through a hole formed in the base and is threadedly engaged with the tapping hole, the screw has a head which comes into close contact with a surface of the base, the bottom of the depressed portion is put in close contact with the base in an area which surrounds the hole and in the threadedly engaged state of the screw, and the sealing tape is put in close contact with an outer periphery of the depressed portion to seal the depressed portion hermetically.

Since the top cover comes into close contact with the base in the area which surrounds the hole formed in the base, the air present within the base can be prevented from leaking through the hole formed in the base or through the tapping hole formed in the top cover. Further, with the sealing tape, the air present within the base can be surely prevented from leaking from the screw side of the tapping hole. Consequently, the inside of the base can be surely maintained in a hermetically sealed condition.

According to the present invention it is possible to provide a data storage device and a magnetic disk drive both permitting the inside of the base to be kept in a hermetically sealed condition.

DETAILED DESCRIPTION OF THE INVENTION

Embodiments to which the present invention is applicable will be described hereinunder with reference to the accompanying drawings.

FIRST EMBODIMENT

First, description will be given of the entire construction of a hard disk drive according to a first embodiment of the present invention. A partial construction of the hard disk drive of the first embodiment is illustrated in an exploded perspective view of FIG. 1. Principal components of the hard disk drive are illustrated in FIG. 1.

Figure 1:
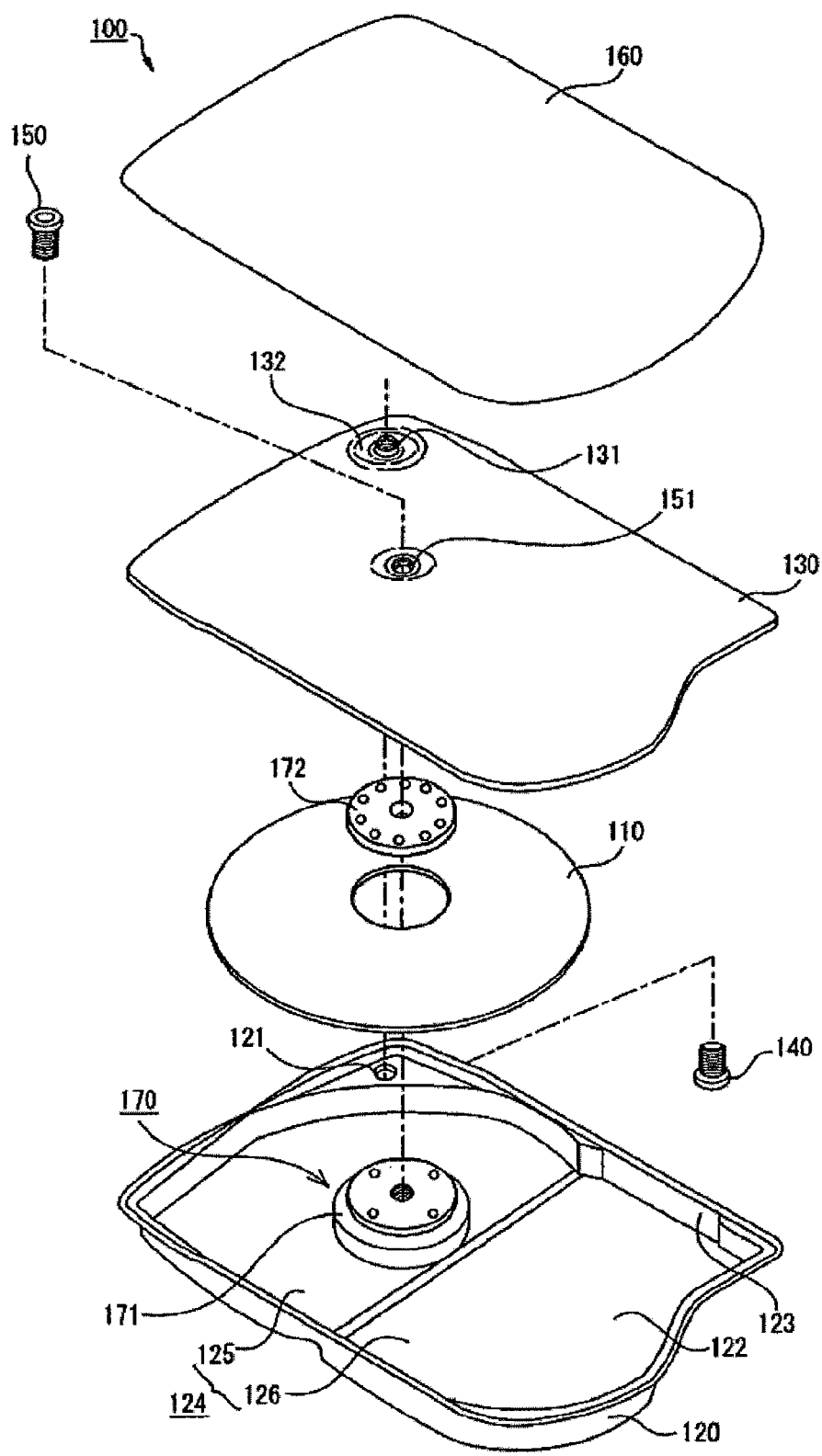
FIG. 1 is an exploded perspective view showing a constructional example of a hard disk drive according to an embodiment of the present invention.

In FIG. 1, the hard disk drive of this first embodiment is indicated at 100. In the same figure, the numeral 110 denotes a magnetic disk, numeral 120 denotes a base, numeral 130 denotes a top cover, numerals 140 and 150 denote screws, numeral 160 denotes a sealing tape, and numeral 170 denotes a spindle motor.

The magnetic disk 110 is a medium for recording information. For example, it is a non-volatile recording disk which records data by magnetization of a magnetic layer. The magnetic disk 110 can be formed by an aluminum substrate or a glass substrate.

The base 120 is in the shape of a box having an upper opening and accommodates various components of the hard disk drive 100. The base 120 is formed by a press working. In the press working, a stock is subjected to such a working as die blanking, die forging, or plate bending. By this press working, a metallic plate fabricated by rolling can be formed into a desired shape. The forming is performed in accordance with the shape of a die. A plate of a magnetic material such as iron and steel (SPCC) or a magnetic stainless steel is used as the base 120.

Such working methods as blanking, drilling, deep drawing, and bending are also known. Press working is easier to perform than forging and is preferred also from the standpoint of manufacturing cost.

A through hole 121 which will be described in detail later is formed in the base 120. The through hole 121 can be formed by partially punching the base 120 which has been formed by press working.

Components of the hard disk drive 100 are fixed to a bottom 122 of the base 120. A wall 123 is formed so as to surround an outer periphery of the bottom 122. An intra-base space 124 defined by the wall 123 is partitioned into a disk receiving area 125 and an actuator receiving area 126. Disk assemblies such as the magnetic disk 110 and a spindle motor to be described later are received in the disk receiving area 125, while an actuator to be described later or the like are received in the actuator receiving area 126.

The top cover 130 is a thin, generally flat plate-like member and is formed by a press working, for example. A tapping hole which will be described in detail later is formed in the top cover 130. A tapping hole 131 is what is called a burring tap. More specifically, the tapping hole 131 projects on one side face of the top cover 130 by burring work. The tapping hole 131 is formed nearly centrally of a depressed portion 132. The depressed portion 132 is generally circular in top view, but no limitation is made thereto and any of various other shapes may be adopted. It is preferable that the shape in top view of the depressed portion 132 be a closed shape surrounding the depressed portion 132.

The hard disk drive 100 of this embodiment has what is called a drop lid type structure. More specifically, the top cover 130 is fitted in the upper opening of the base 120 to close the upper opening. In this state, the top cover 130 covers disk assemblies such as the magnetic disk 110, as well as a spindle motor and an actuator both to be described later. The top cover 130 is fixed to the base 120 through a gasket (not shown) formed of fluoro rubber, for example.

The screws 140 and 150 are tapping screws. As will be described later, the screw 140 fixes the top cover 130 to the base 120. The screw 150 not only fixes the top cover 130 to the base 120 but also fixes a spindle motor 170 within the intra-base space 124 formed in the base 120. Further, the screw 150 is inserted through a through hole 151 and is threadedly engaged with the spindle motor 170.

The sealing tape 160 is a substantially sheet-like tape formed of a synthetic resin for example and with an adhesive or a pressure-sensitive adhesive applied to a surface thereof. The sealing tape 160 is affixed to the top cover 130 to close up a gap formed between the base 120 and the top cover 130. In this way a disk enclosure is constituted, in which assemblies of the hard disk drive 100 are accommodated in a hermetically sealed condition. In order to close up the gap between the base 120 and the top cover 130, it is preferable that the size of the sealing tape 160 be large enough to cover the upper opening of the base 120.

The shape of the sealing tape 160 may be such a shape as permits the tape to be affixed to only air leaking portions. More particularly, the shape of the sealing tape 160 may be such a shape as covers the outer periphery of the base 120 and the vicinity of the screw 140. In this case, the sealing tape 160 may be a single sheet or may be physically separated.

The spindle motor 170 is a motor for rotating the magnetic disk 110. More particularly, the spindle motor 170 may be a fluid bearing motor. In the case of a fluid bearing motor, only a fluid such as oil is present between a rotating part and a fixed part in a bearing portion on a rotary shaft of the motor, so that the rotating part can rotate smoothly. The spindle motor 170 may be a ball bearing motor.

The spindle motor 170 is disposed nearly centrally of the bottom 122 of the disk receiving area 125 and is fixed to the bottom 122 of an inner surface of the base 120. A hub 171 is disposed along an outer periphery of an upper surface of the spindle motor 170. The spindle motor 170 is connected to a circuit board (not shown). The circuit board not shown is attached to an outer surface (lower surface) of the base 120 and typically has a generally rectangular shape of such a size as covers an outer half surface of the base 120.

The magnetic disk 110 is put on the hub 171 of the spindle motor 170 and a top clamp 172 is put on the magnetic disk 110. In this state, the hub 171 holds the magnetic disk 110 grippingly between it and the top clamp 172. The top clamp 172 is secured to the spindle motor 170 with the screw 150. As a result, the magnetic disk 110 is fixed to the spindle motor 170 and is rotated at a predetermined rotational speed by the spindle motor 170.

Figure 2:
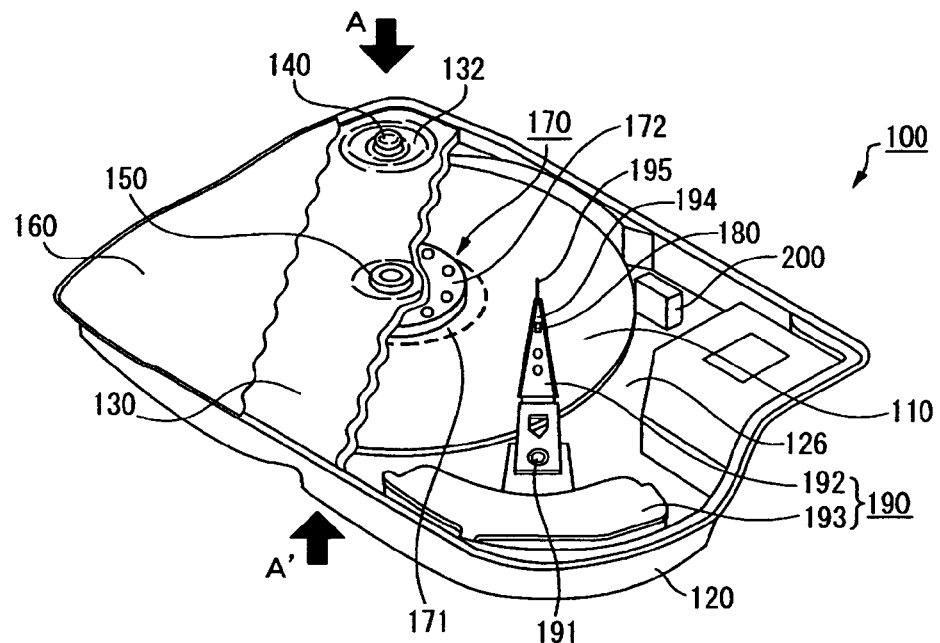
FIG. 2 is a perspective view showing a constructional example of the hard disk drive according to the present invention.

A constructional example of the hard disk drive 100 according to this embodiment is illustrated in a perspective view of FIG. 2. The same figure shows a state in which the components of the hard disk drive 100 are accommodated in the base 120.

In FIG. 2, the numeral 180 denotes a head, numeral 190 denotes an actuator, and numeral 200 denotes a ramp mechanism.

The head 180 writes and/or reads data with respect to the magnetic disk 110, the data being received and/or transmitted between the head and a host (not shown). The head 180 has a read element and/or a write element. The read element converts an electric signal to a magnetic field in accordance with write data for the magnetic disk 110. The read element converts a magnetic field provided from the magnetic disk 110 to an electric signal. The slider is formed on a surface(s) of the write element and/or the read element.

The actuator 190 supports the head 180 at one end thereof and is held at an opposite end thereof pivotably by a pivot shaft 191. With the pivot shaft 191, the actuator 190 can move the head 180 over the magnetic disk 110 or to a desired position away from the magnetic disk 110. Through an FPC (Flexible Printed Circuit) (not shown) the actuator 190 is connected to a circuit board (not shown) which is mounted to the bottom of the base 120.

The actuator 190 includes an actuator arm 192 and a VCM (Voice Coil Motor) 193. A suspension 194 having elasticity is provided at a front end of the actuator arm 192. The head 180 is fixed to the suspension 194. Further, a tab 195 is formed at a front end of the suspension 194. The actuator arm 192 is pivotably secured to the pivot shaft 191 of VCM 193. The actuator arm 192 and the VCM 193 are accommodated in the actuator receiving area 126 formed in the base 120.

When the rotation of the magnetic disk 110 stops, the ramp mechanism 200 causes the head 180 to be retracted from the magnetic disk 110.

The hard disk drive 100 thus constructed operates as follows.

When the hard disk drive 100 is OFF, the magnetic disk 100 is at rest. In accordance with a drive signal flowing from a controller (not shown) to a flat coil, the VCM 193 causes the actuator arm 192 to pivot about the pivot shaft 191, whereby the head 180 can move over the magnetic disk 110 or move to the outside of the magnetic disk.

The spindle motor 170 inputs and outputs motor driving electric power and signals with respect to a circuit board (not shown). The actuator 190 inputs and outputs power for the coil in VCM 193, electric power for read operation of the head 180 and signals with respect to the circuit board (not shown). These input and output operations between the circuit board (not shown) and the actuator 190 are performed through an FPC (not shown).

For read of data from or write of data to the magnetic disk 110, the actuator 190 causes the head 180 to move over the data area defined on the surface of the magnetic disk 110 which is rotating. With a pivotal motion of the actuator 190, the head 180 moves radially of the surface of the magnetic disk 110. In this way the head 180 can make access to a desired track.

When pressure based on the viscosity of air present between an ABS (Air Bearing Surface) of the slider opposed to the magnetic disk 110 and the magnetic disk 110 which is rotating and pressure applied toward the magnetic disk 110 by the actuator 190 balance with each other, the head 180 floats over the magnetic disk 110 through a certain gap.

The hard disk drive 100 of this embodiment is a disk drive called load/unload type. More particularly, when the rotation of the magnetic disk 110 stops, the head 180 comes into contact with the surface of the magnetic disk 110 and an attraction phenomenon occurs, thus giving rise to problems such as damage of the data area and failure to rotation of the magnetic disk. To avoid this inconvenience, when the rotation of the magnetic disk 110 stops, the actuator 190 causes the head 180 to be retracted from the data area to the ramp mechanism 200.

As the actuator 190 pivots toward the ramp mechanism 200, the tab 195 at the front end of the actuator 190 moves while sliding on the surface of the ramp mechanism 200. The sliding tab 195 then puts on a parking surface formed on the ramp mechanism 200, whereby the head 180 is unloaded. For loading of the head, the actuator 190 which has been held on the parking surface is disengaged from the ramp mechanism 200 and moves to a position over the surface of the magnetic disk 110. In a hard disk drive of CSS (Contact Start and Stop) type, the head 180 is retracted to a CSS zone which is formed on an inner periphery side of the magnetic disk 110.

Although the hard disk drive of this embodiment is provided with a single magnetic disk 110, the present invention is also applicable to a hard disk drive provided with plural magnetic disks. For both-side recording of plural magnetic disks, the plural magnetic disks are held all together by the hub 171 at predetermined intervals in the rotational axis direction of the spindle motor 170. Actuator arms which hold heads for scanning recording surfaces are provided by the number corresponding to the number of the recording surfaces and are fixed to the actuator 190 at positions where they overlap the actuator arm 192 at predetermined spacing.

The following description is now provided about a mode of fixing the top cover 130 to the base 120 in the hard disk drive 100 according to embodiments of the present invention.

Figure 3:
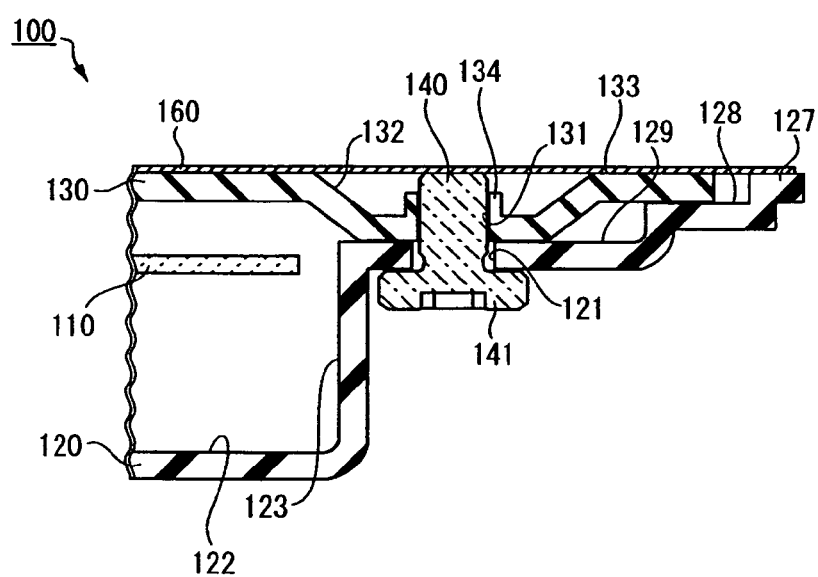
FIG. 3 is a sectional view taken on line A-A' in FIG. 2, showing a constructional example of the hard disk drive according to the present invention.

A constructional example of the hard disk drive 100 is shown in a sectional view of FIG. 3. In this sectional view, a section taken on line A-A' is shown partially and the vicinity of the screw 140 is shown.

As shown in FIG. 3, an upper base step 128 and a lower base step 129 are formed along an outer periphery of the base 120. The base steps 128 and 129 are stepped surfaces formed stepwise from the outer periphery of the base 120. The base steps 128 and 129 may be provided in the vicinity of the fixed portion fixed by the screw 140. Alternatively, the base steps 128 and 129 may be provided throughout the outer periphery of the base 120 or may be provided at only predetermined plural positions at the outer periphery of the base 120, including the position where the screw 140 is mounted.

The top cover 130 is put on the upper base step 128 from above. More specifically, an outer periphery of the top cover 130 is engaged onto and supported by the upper base step 128. In this case, the projecting side of the depressed portion 132 in the top cover 130 is positioned on the base 120 side. That is, the bottom of the depressed portion 132 is opposed to the surface of the upper base step 128. In this opposed state, the tapping hole 131 formed in the depressed portion 132 is positioned on the through hole 121.

The tapping hole 131 has a projecting portion 134 formed by burring. The projecting portion 134 projects to the side opposite to the depressed side of the depressed portion 132 of the top cover 130. Therefore, the tapping hole 131 projects upward in the disposed state of the top cover 130. In other words, the top cover 130 is disposed in such a manner that the projecting portion 134 projects from the base 120 side toward the top cover 130. The degree of projection of the projecting portion 134 is approximately equal to or smaller than the depth of the depressed portion.

In this state the top cover 130 is fixed by the screw 140. More specifically, the screw 140 is inserted through the through hole 121 from the side (below the base 120) opposite to the top cover 130 with respect to the base 120 and is threadedly engaged with the tapping hole 131 formed in the top cover 130. The screw 140 thus engaged threadedly with the tapping hole is tightened strongly, whereby the top cover 130 is fixed onto the base 120. Further, the top cover 130 is fixed to the base 120 by the screw 150 together with the screw 140.

In the vicinity of the screw 140, the bottom of the depressed portion 132 of the top cover 130 is put in close contact with the surface of the lower base step 129 because the screw 140 is tightened strongly. In this close-contact state, therefore, the lower base step 129 is enclosed by the bottom of the depressed portion 132.

When the top cover 130 is put on the base 120, the bottom of the depressed portion 132 may be abutted against or merely in close proximity to the lower base step 129 insofar as it comes into abutment against the surface of the lower base step 129 when the top cover 130 is fixed to the base 120 with screws 140 and 150.

With a strong clamping force induced when the screw 140 clamps the top cover 130, a head 141 of the screw 140 is brought into abutment against a bottom of the lower base step 129. More specifically, upper and lower opposed surfaces of the lower base step 129 are put in pressure contact with the bottom of the depressed portion 132 in the top cover 130 and the head 141 of the screw 140, respectively. Consequently, the lower base step 129 is held strongly between the head 141 and the depressed portion 132.

When the top cover 130 is fixed to the base 120, it is covered with the sealing tape 160. More concretely, the sealing tape 160 is affixed to the top cover 130 in a state in which its surface coated with an adhesive or a pressure-sensitive adhesive is positioned on the top cover 130 side. In more particular terms, the sealing tape 160 is affixed substantially flatwise onto the surface (the side opposite to the base 120) of the top cover 130 and is also affixed to the surface of an outer edge portion 127 of the base 120.

The sealing tape 160, in this affixed state thereof, covers the depressed portion 132 of the top cover 130. More particularly, the sealing tape 160 is bonded to an outer periphery portion 133 of the depressed portion 132, whereby the sealing tape 160 is put in close contact with an outer periphery portion 133 of the depressed portion 132. Therefore, in this close-contact state, the depressed portion 132 is enclosed with the sealing tape 160.

As shown in FIG. 3, a tip end of the screw 140 projects from the tapping hole 131. The height of projection of the screw 140 is approximately equal to the depth of the depressed portion 132. The tip end of the screw 140 and the surface of the top cover 130 are approximately flush with each other. The sealing tape 160 is affixed substantially flatwise throughout the whole of the top cover 130, including the projecting end of the screw 140. As a result, the tip end of the screw 140 is closed between the sealing tape 160 and the depressed portion 132.

In the case where the tip end of the screw 140 does not project from the tapping hole 131, the sealing tape 160 is affixed to an end portion of the tapping hole 131. Further, where the tip end of the screw 140 projects excessively from the tapping hole 131, the sealing tape 160 may be formed with such concave and convex as cover the projecting end of the screw. Even in such a shape the sealing tape 160 can come into close contact with the outer periphery portion 133 of the depressed portion 132.

Thus, in the clamped state of the top cover 130 with the screw 140, the bottom of the depressed portion 132 is in close contact with the lower base step 129, so that the air present in the intra-base space 124, i.e., the space defined by both the base 120 and the top cover 130, is sealed. Therefore, the air present in the intra-base space 124 can be prevented from leaking from between the lower base step 129 and the top cover 130.

Further, since the depressed portion 132 is closed with the sealing tape 160, the tapping hole 131 is sealed hermetically on the tip end side of the screw 140. As a result, the gap between the tapping hole 131 and the screw 140, i.e., the space near the side face of the screw 140, is sealed hermetically between the head 141 of the screw 140 and the sealing tape 160. Therefore, even if the air present in the intra-base space 124 leaks from between the lower base step 129 and the top cover 130, a further leakage thereof can be prevented between the head 141 and the sealing tape 160.

Further, with the screw 140 tightened, the head 141 of the screw comes into close contact with the bottom of the lower base step 129, so that the leakage of air from the through hole 121 of the base 120 can be prevented.

In the hard disk drive 100 of the present embodiment, as described above, the air present in the intra-base space 24 can be surely prevented from leaking from the vicinity of the screw 140. Therefore, it is possible to prevent a lowering in internal pressure of the intra-base space 124 and hence possible to prevent the entry of dust or the like from the exterior which is caused by a lowering of the internal pressure. Thus, a trouble of the hard disk drive 100 caused by the entry of dust can be prevented and it is possible to improve the durability and reliability.

In addition, since the base 120 and the top cover 130 can be formed inexpensively by press working, it is possible to reduce the manufacturing cost of the hard disk drive 100. Moreover, although the sealing tape 160 is generally used for hermetically sealing the air in the intra-base space 124, the sealing tape 160 can also be used for preventing the leakage of air in the vicinity of the screw 140, more particularly, in the tapping hole 131. Thus, the leakage of air can be prevented inexpensively and positively without newly providing a structure for preventing the leakage of air.

Although in this embodiment the depressed portion 132 is formed in the top cover 130, no limitation is made thereto. More particularly, the shape of the top cover 130 may be a substantially flat shape free of any concave and convex as a whole insofar as the top cover 130 encloses the vicinity of the through hole 121 in the base 120 in a closely contacted state. In this case, the leakage of air can be prevented more positively because it is possible to increase the area of close contact between the base 120 and the top cover 130.

The present invention is also applicable to the case where the base 120 and the top cover 130 are formed by any other working method, e.g., die casting. In this case, the fixed portion of the base 120 fixed with the screw 140 is formed thin.

SECOND EMBODIMENT

In the previous first embodiment, the projecting portion 134 of the top cover 130 projects outside (the sealing tape 160 side), but in this second embodiment, a description will be given below about the case where the projecting portion of the top cover projects inside (the base 120 side).

Figure 4:
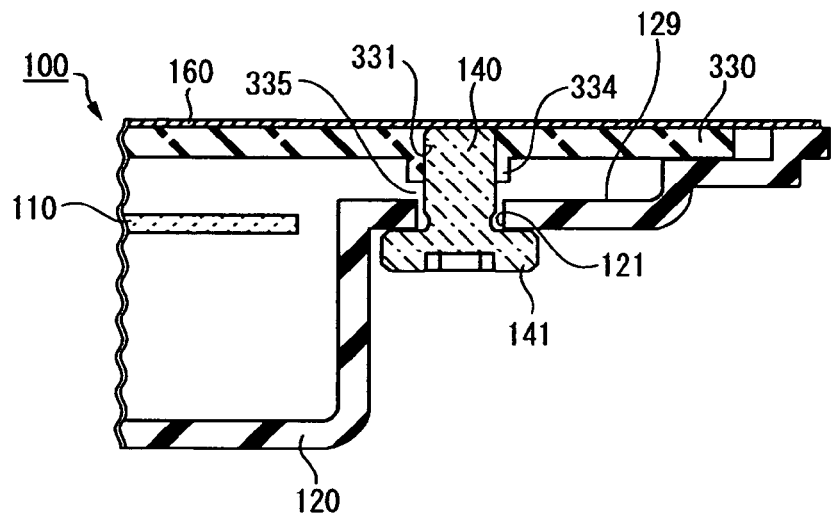
FIG. 4 is a sectional view showing a constructional example of a hard disk drive according to another example of the present invention.
Figure 5:
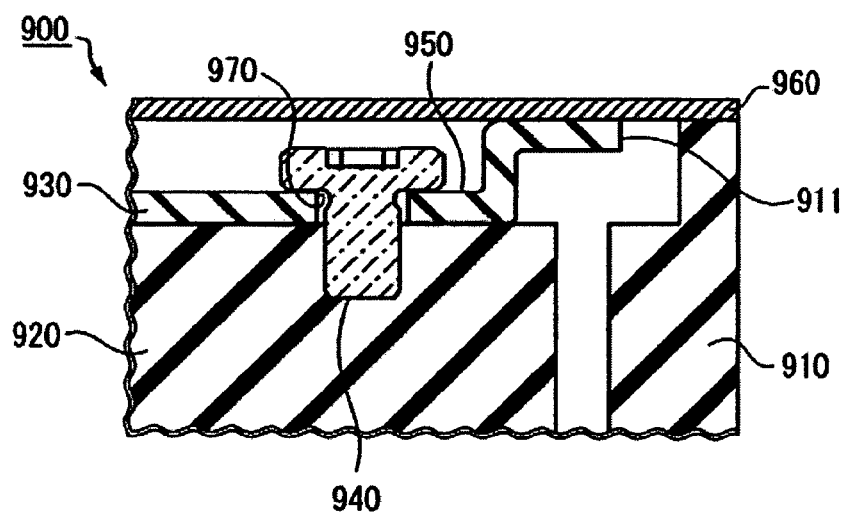
FIG. 5 is a sectional view showing a constructional example of a conventional hard disk drive.

Such a case is illustrated in FIG. 4 which is a sectional view showing a constructional example of a hard disk drive 100 according to a second embodiment of the present invention. In FIG. 4, the numeral 330 denotes a top cover, numeral 331 denotes a tapping hole, and numeral 334 denotes a projecting portion. The same components as those of the hard disk drive 100 shown in FIGS. 1 to 3 are identified by the same reference numerals as in FIGS. 1 to 3 and explanations thereof will here be omitted.

Unlike the top cover 130, the top cover 330 has a generally flat shape free of the depressed portion 132. The top cover 330 can also be formed by press working.

The tapping hole 331 is the same burring tap as the tapping hole 133 and is formed by burring. Thus, the tapping hole 331 has the projecting portion 334 which projects from one side face of the top cover 330. The side face opposite to the side face of the top cover 330 where the projecting portion 334 is formed can be made substantially flat.

As shown in FIG. 4, the top cover 330, like the top cover 130, is fitted in the upper opening of the base 120 and closes the upper opening. In this state, unlike the top cover 130, the projecting portion 334 in the top cover 330 projects to the base 120 side. That is, the projecting portion 334 is positioned between the top cover 330 and the base 120.

The top cover 330 is fixed to the base 120 with a screw 140. The screw 140 is brought into threaded engagement with the tapping hole 331 from below the base 120 and is tightened strongly. As a result of this strong tightening of the screw 140, a head 141 of the screw comes into close contact with the bottom of the lower base step 129 of the base 120. Consequently, the leakage of air from the head 141 side of the screw 140 can be prevented.

A sealing tape 160 is affixed onto the top cover 330. At this time, the projecting portion 334 of the top cover 330 faces to the interior of the base 120 and does not project to the sealing tape 160 side. Therefore, the sealing tape 160 can be affixed easily onto the top cover 330. Further, since the sealing tape 160 closes the screw side of the tapping hole 331, the occurrence of air leakage on the screw side can be prevented.

The sealing tape 160 is for sealing the gap between the top cover 330 and the base 120. Thus, it is not necessary to newly use a sealing tape for preventing the leakage of air from the tapping hole 331, that is, it is possible to prevent an increase of the production cost caused by taking a measure for preventing such air leakage.

Thus, also in the hard disk drive 100 of this second embodiment, the leakage of air on both the head 141 side and the sealing tape 160 side of the screw 140 can be prevented. In the previous first embodiment, in addition to the prevention of air leakage on the head 141 side and the sealing tape 160 side, a further prevention of air leakage is attained by a close contact between the top cover 130 and the base 120. Although it is possible to prevent the leakage of air at two positions as in this second embodiment, it is preferable that the leakage of air be prevented at three positions as in the previous first embodiment.

In the case where not only the top cover 330 but also the base 120 is formed by press working as in this second embodiment, the tapping hole 331 for threaded engagement therewith of the screw is usually a burring tap. In this case, since the height capable of burring is limited, it is impossible to increase the number of screw threads and hence the burring tap 331 cannot be made a stop hole through which the screw does not pass. Therefore, the leakage of air is not from the head 141 side of the screw 140 but from the screw side of the tapping hole 331 whose inner side face is threaded. In this embodiment, since the sealing tape 160 seals the screw side of the tapping hole 331 hermetically, the leakage of air on the screw side can be prevented.

When the projecting portion 334 faces the inside of the base 120, there sometimes is a case where the projecting portion 334 does not come into close contact with the surface of the lower base step 129 in the tightened state of the screw 140. That is, as the case may be, a gap 335 is formed between the projecting portion 334 and the base 120. Further, since the inner side face of the through hole 121 through which the screw 140 passes is of a narrow width, it is impossible to form a tap. In this case, the screw 140 merely passes through the through hole 121. Consequently, the base 120 becomes movable toward the top cover 330.

Thus, for some stimulation, the head 141 of the screw may leave the base 120 with consequent leakage of air from the through hole 121. Therefore, to prevent the formation of the gap 335, it is preferable that the base 120 and the top cover 130 be in close contact with each other as in the first embodiment, whereby the leakage of air can be prevented more positively.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A data storage device comprising:
a medium to record data;
a base in which said medium is accommodated, said base formed from a single magnetic plate and having a hole;
a top cover having a tapping hole aligned with said hole of said base; and
a screw inserted through said hole from a side opposite said top cover with respect to said base and into threaded engagement with said tapping hole, said screw having a head which comes into direct contact with a bottom surface of said base and a portion opposite said head of said screw extending from said tapping hole of said top cover;
wherein said top cover is fitted inside said base and is put in close contact with said base in an area which surrounds said hole and in the threadedly engaged state of said screw;
wherein said top cover has a depressed portion, said tapping hole is formed in a bottom of said depressed portion, said top cover is fitted inside said base in a state in which said depressed portion is positioned on said base side, and the bottom of said depressed portion is put in close contact with said base in the area which surrounds said hole.

2. A data storage device according to claim 1, wherein said base is formed by press working.

3. A data storage device according to claim 1, wherein said hole is a through hole, and said screw is threadedly engaged with said tapping hole in an inserted state thereof through said through hole.

4. A data storage device according to claim 1, further comprising a sealing tape which covers said tapping hole, wherein said sealing tape comes into close contact with an outer periphery of said depressed portion to seal the depressed portion hermetically.

5. A data storage device according to claim 4, wherein said sealing tape is a single sealing tape which covers the whole surface of said top cover.

6. A data storage device according to claim 1, wherein said depressed portion has a projecting portion formed on the bottom thereof, and said tapping hole is a burring tap formed within said projecting portion.

7. A data storage device comprising:
a medium to record data;
a base in which said medium is accommodated, said base formed from a single magnetic plate and having a hole;
a top cover having a tapping hole aligned with said hole of said base;

a screw inserted through said hole from a side opposite said top cover with respect to said base and into threaded engagement with said tapping hole, said screw having a head which comes into direct contact with a bottom surface of said base and a portion opposite said head of said screw extending from said tapping hole of said top cover; and a sealing tape which covers said tapping hole;

wherein said top cover has a depressed portion, said tapping hole is formed in a bottom of said depressed portion, said top cover is fitted inside said base in a state in which said depressed portion is positioned on said base side, the bottom of said depressed portion is put in close contact with said base in an area which surrounds said hole and in the threadedly engaged state of said screw, said sealing tape is put in close contact with an outer periphery of said depressed portion to seal the depressed portion hermetically, said depressed portion has a projecting portion formed on the bottom thereof, and said tapping hole is a burring tap formed within said projecting portion.

8. A data storage device according to claim 7, wherein said base is formed by press working.

9. A data storage device according to claim 7, wherein said hole is a through hole, and said screw is threadedly engaged with said tapping hole in an inserted state thereof through said through hole.

10. A data storage device according to claim 7, wherein said top cover is fitted inside said base and along an outer periphery of said base, and said sealing tape is put in close contact with said top cover and said base to seal a gap formed between the base and the top cover.

11. A data storage device according to claim 7, wherein said sealing tape is a single sealing tape which covers the whole surface of said top cover.

12. A data storage device according to claim 7, wherein said top cover has a close-contact portion which, in the threadedly engaged state of said screw, comes into close contact with the surface on the top cover side of said base in a surrounding relation to said through hole.

13. A data storage device according to claim 7, wherein said top cover has a close-contact portion which, in the threadedly engaged state of said screw, comes into close contact with the surface on the top cover side of said base in a surrounding relation to said through hole, said top cover is fitted inside said base and along an outer periphery of said base, and said sealing tape is put in close contact with said top cover and said base to seal a gap formed between the base and the top cover.

14. A data storage device according to claim 7, wherein said top cover is fitted inside said base and along an outer periphery of said base, said sealing tape is put in close contact with said top cover and said base to seal a gap formed between the base and the top cover, said top cover has a depressed portion, said tapping hole is formed in a bottom of said depressed portion, said top cover is fitted inside said base in a state in which said depressed portion is positioned on said base side, the bottom of said depressed portion is put in close contact with said base in an area which surrounds said hole and in the threadedly engaged state of said screw, and said sealing tape is put in close contact with an outer periphery of said depressed portion to seal the depressed portion hermetically.

15. A data storage device according to claim 14, wherein said depressed portion has a projecting portion formed on the bottom thereof, and said tapping hole is a burring tap formed within said projecting portion.

16. A magnetic disk drive comprising:

a magnetic disk to record magnetic data;

a motor to rotate said magnetic disk;

a head to make access to a recording area on said magnetic disk;

a base formed from a single magnetic plate and which accommodates said magnetic disk, said motor and said head;

a top cover fitted inside said base and along an outer periphery of said base;

a sealing tape which is put in close contact with said top cover and said base to seal a gap formed between the base and the top cover; and a screw to attach said base to said top cover;

wherein said top cover has a depressed portion depressed on said base side and with a tapping hole formed in a bottom thereof, said screw is inserted through a hole formed in said base from a side opposite said top cover with respect to said base and is threadedly engaged with said tapping hole, said screw has a head which comes into direct contact with a bottom surface of said base and a portion opposite said head of said screw extending from said tapping hole of said top cover, the bottom of said depressed portion is put in close contact with said base in an area which surrounds said hole and in the threadedly engaged state of said screw, and said sealing tape is put in close contact with an outer periphery of said depressed portion to seal the depressed portion hermetically.

17. A magnetic disk drive according to claim 16, wherein said sealing tape is a single sealing tape which covers the whole surface of said top cover.

18. A magnetic disk drive according to claim 16, wherein said depressed portion has a projecting portion formed on the bottom thereof, and said tapping hole is a buffing tap formed within said projecting portion.

\* \* \* \* \*

UNITED STATES PATENT AND TRADEMARK OFFICE
CERTIFICATE OF CORRECTION

PATENT NO. : 7,570,455 B2  Page 1 of 1
APPLICATION NO. : 11/138233
DATED : August 4, 2009
INVENTOR(S) : Deguchi et al.

It is certified that error appears in the above-identified patent and that said Letters Patent is hereby corrected as shown below:

On the Title Pg:

Item (56) References Cited, Foreign Patent Documents,
please delete "JP 2000-234652" and insert -- JP 2000-234650 --.

Claim 18, column 14, line 50, please delete "buffing" and insert -- burring --.

Signed and Sealed this

Twentieth Day of October, 2009

David J. Kappos
*Director of the United States Patent and Trademark Office*